United States Patent [19]
Chojecki

[11] Patent Number: 6,098,775
[45] Date of Patent: Aug. 8, 2000

[54] SPUD LOCKING ASSEMBLY FOR A PNEUMATICALLY ACTUATED CLUTCH/BRAKE

[75] Inventor: Douglas Alan Chojecki, Wichita Falls, Tex.

[73] Assignee: Warner Electric Technology, Inc., Richmond, Va.

[21] Appl. No.: 09/213,718

[22] Filed: Dec. 17, 1998

Related U.S. Application Data

[60] Provisional application No. 60/068,722, Dec. 23, 1997.

[51] Int. Cl.⁷ .................................................. F16D 25/04
[52] U.S. Cl. ......................................... 192/88 A; 411/107
[58] Field of Search ..................................... 411/195, 418, 411/399, 107; 192/88 A, 70.13, 70.2, 70.28, 88 R

[56] References Cited

U.S. PATENT DOCUMENTS

| | | | |
|---|---|---|---|
| 2,730,154 | 1/1956 | Aspey | 411/321 |
| 3,473,119 | 10/1969 | Dey | 411/349 |
| 4,572,718 | 2/1986 | Stevens et al. | 411/107 |
| 4,734,001 | 3/1988 | Bennett | 411/119 |
| 4,906,150 | 3/1990 | Bennett | 411/119 |
| 5,280,829 | 1/1994 | Forsythe | 192/70.13 |
| 5,493,883 | 2/1996 | Myers | 411/399 X |

OTHER PUBLICATIONS

Dana Corporation Desing Drawings. (Brake Spud).

*Primary Examiner*—Rodney H. Bonck
*Assistant Examiner*—Saul Rodriguez
*Attorney, Agent, or Firm*—Dykema Gossett PLLC

[57] ABSTRACT

A spud assembly is provided for use in a pneumatically actuated brake, clutch or other friction assembly. The spud assembly includes a spud and a washer that are configured to reduce axial and rotational movement of the spud within the friction assembly. The spud includes a body portion that is centered about a first axis and extends through an aperture in a holding plate of the friction assembly. The body portion includes an outer wall that defines a pair of diametrically opposed flats. The flats engage a corresponding pair of flats in the washer which is fixed against rotation relative to the friction assembly holding plate. The spud also includes a holding member, such as a circular flange, that extends radially outwardly from the body portion of the spud. The holding member abuts one side of the holding plate to reduce axial movement of the spud.

20 Claims, 2 Drawing Sheets

SPUD LOCKING ASSEMBLY FOR A PNEUMATICALLY ACTUATED CLUTCH/BRAKE

CLAIM OF PRIORITY

This application claims the benefit of U.S. Provisional Application No. 60/068,722, filed Dec. 23, 1997.

BACKGROUND OF THE INVENTION

1. Field of the Invention

This invention relate s to a spud assembly for use in a pneumatically actuated brake, clutch or other friction assembly and, in particular, to a spud assembly that reduces and/or eliminates movement of the spud and, consequently, failures at the interface between the spud and bladder within the friction assembly.

2. Disclosure of Related Art

A conventional pneumatically actuated brake, clutch, or other friction assembly includes a hub that is centered about a first axis and a holding plate that is fixed to the hub and extends radially outwardly from the first axis. The assembly further includes a pressure plate that is axially spaced from the holding plate, friction discs disposed on a first side of the pressure plate, arid a bladder disposed between the holding plate and a second side of the pressure plate. Finally, the assembly includes a spud that connects the bladder to a pump hose and through which the bladder may be selectively expanded and contracted to cause axial movement in the pressure plate and selective engagement and disengagement of the pressure plate with the friction discs. One end of the spud is connected to the bladder and the remainder of the spud extends through an aperture in the holding plate.

The above-described conventional friction assemblies have been subject to failure at the interface between the spud and the bladder because of the tendency of the spud to move during (i) installation of the pump hose; (2) loading of the pump hose; and (3) actuation and deactuation of the friction assembly. One known attempt to solve this problem has been to shape both the outer wall of the spud and the aperture in the holding plate so that each has a pair of diametrically opposed flats. The corresponding pairs of flats act to restrict rotational movement of the spud. This approach has several drawbacks, however. First, the aperture in the holding plate must be broached and/or milled thereby increasing manufacturing costs. Second, failures at the spud/bladder interface still occur. One reason for the recurring failure is that the above-described approach fails to account for axial movement of the spud relative to the bladder.

There is thus a need for a spud and spud assembly that will minimize or eliminate one or more of the above-mentioned deficiencies.

SUMMARY OF THE INVENTION

The present invention provides a spud assembly for use in a pneumatically-actuated brake, clutch, or other friction assembly.

An object of the present invention is to provide a spud assembly which, when used within a brake, clutch, or other friction assembly, will minimize and/or eliminate failures at the spud/bladder interface.

Another object of the present invention is to provide a spud assembly which, when used within a brake, clutch, or other friction assembly, will eliminate the need for broaching and/or milling of the aperture of the holding plate in the friction assembly.

A spud assembly in accordance with the present invention includes a spud and a washer. The spud includes a body portion that is centered about a first axis. The body portion may extend through an aperture in a fixed member—such as a friction assembly holding plate—to engage a bladder or other inflatable device. The body portion includes an outer wall that may define a first pair of diametrically opposed flats. The washer may be disposed about the body portion of the spud and an inner periphery of the washer may define a second pair of diametrically opposed flats corresponding to first pair of flats of the spud. The washer may be fixed against rotation relative to the fixed member to thereby restrict rotational movement of the spud. Because the washer prevents rotation of the spud, the aperture in the fixed member can be made circular and the broaching and/or milling operation required in conventional assemblies may be eliminated, thereby reducing manufacturing costs.

In additional to limiting rotational movement of the spud, a spud assembly in accordance with the present invention is designed to limit axial movement of the spud. First, the outer wall of the spud may define a first plurality of threads. The threads are configured to matingly engage a second plurality of threads in a nut. The nut may be used to restrict axial movement of the spud by clamping down against a first side of the fixed member through which the spud extends. Second, the spud may also include a holding member that extends radially outwardly from the body portion of the spud. Like the nut, the holding member limits axial movement of the spud. In particular, the holding member is configured to engage a second side of the fixed member in order to prevent the spud from being drawn through the aperture in the fixed member upon clamping of the nut. In accordance with the present invention, the radial distance of the holding member from the first axis is at least 1.15 times the radial distance of either the body portion of the spud or the aperture in the fixed member. This comparative radial distance is greater than that found in conventional spud assemblies and allows a greater degree of surface engagement between the holding member and the second side of the fixed members As a result, the spud is less susceptible to axial movement upon clamping of the nut.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
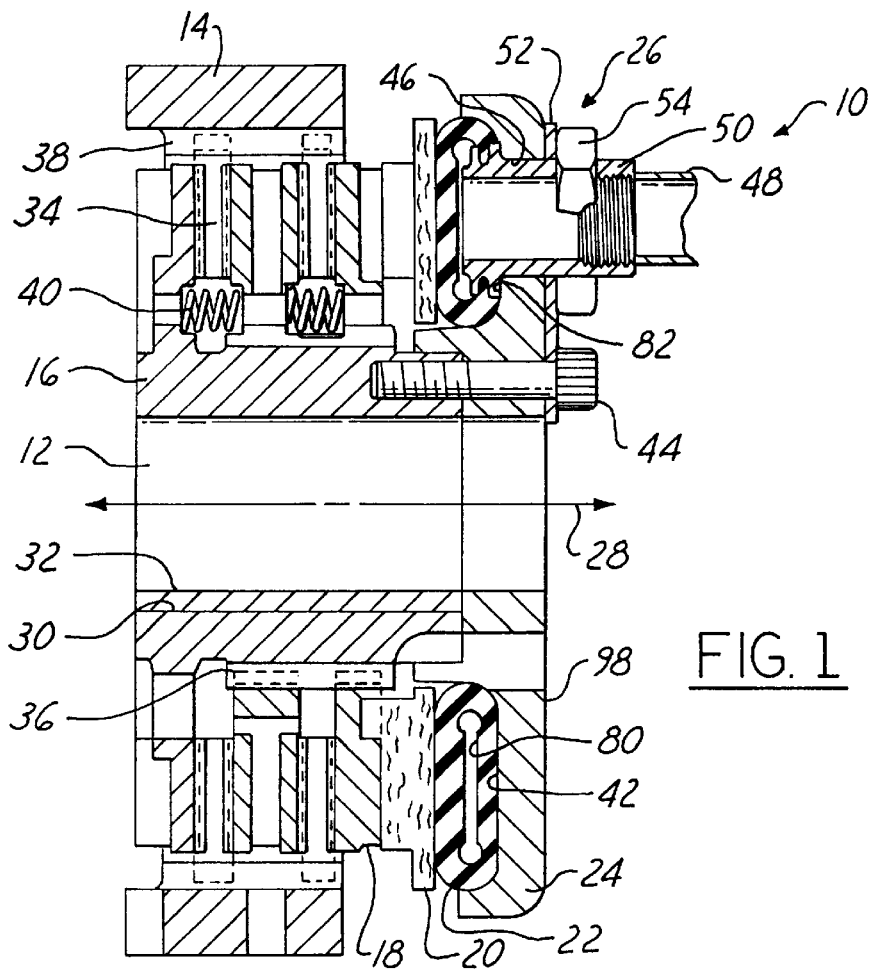
FIG. 1 is fragmentary, cross-sectional view of a friction assembly in accordance with the present invention.

Referring now to the drawings wherein like reference numerals are used to identify identical components in the various views, FIG. 1 illustrates a friction assembly 10 in accordance with the present invention. Assembly 10 is provided to transmit torque from a drive shaft 12 to a driven ring 14, Assembly 10 may include a drive hub 16, friction discs 18, a pressure plate 20, a bladder 22, a holding plate 24, and a spud assembly 26 in accordance with the present invention.

Hub 16 provides structural support for the components of friction assembly 10 and is conventional in the art. Hub 16 may be made from a variety of conventional metals or plastics. Hub 16 is centered about an axis 26 extending through shaft 12 and is disposed radially outwardly of shaft 12. Hub 16 is mounted to shaft 12 for rotation therewith. In particular, hub 16 may include an axially extending keyway 30 configured to receive an axially extending key 32 on shaft 12.

Friction discs 16 are provided to frictionally engage a corresponding set of friction discs 34 connected to driven ring 14. Discs 18, 34 are both conventional in the art. Discs 18 are connected to axially extending splines 36 disposed about a radially outer periphery of hub 16, while discs 34 are connected to axially extending splines 38 disposed about a radially inner periphery of driven ring 14. As a result, discs 18, 34 rotate with hub 16 and ring 14, respectively, but are axially movable relative to hub 16 and ring 14, respectively. Biasing spring 40 bias discs 16, 34 apart such that discs 18 are normally disengaged from discs 34.

Pressure plate 20 is provided to force discs 16 into engagement with discs 34 upon actuation of bladder 22. Plate 20 is conventional in the art and may be made from a variety of conventional metals or plastics. Plate 20 is annular, is centered about axis 28, and is axially spaced from holding plate 24 by bladder 22.

Bladder 22 is provided to selectively urge pressure plate 20 into and out of engagement with friction discs 18. Bladder 22 is conventional in the art and may be made from rubber or another elastic material. Bladder 22 is annular, is centered about axis 28, and is disposed within a seat 42 formed by holding plate 24.

Holding plate 24 is provided to restrict the axial movement of bladder 22 in a first axial direction (to the right in FIG. 1), plate 24 is conventional in the art and may be made from a variety of conventional metals or plastics. Plate 24 extends radially outwardly from axis 28 and is mounted for rotation with hub 16 by bolts 44 or another fastening means. Plate 24 includes an aperture 46 through which air or fluid is provided to bladder 22.

Spud assembly 26 is provided as a means for transmitting air, a liquid, or another medium from a pump hose 48 to bladder 22 in order to selectively expand and contract bladder 22 and thereby cause the selective engagement of plate 20 and discs 18, 34. Assembly 26 may include a spud 50, a washer 52, and a nut 54.

Figure 4:
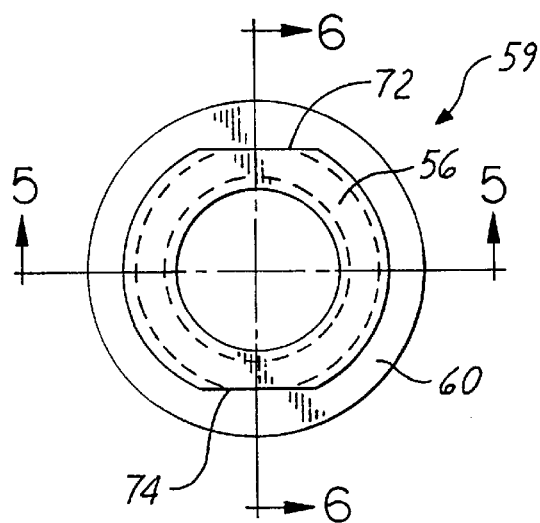
FIG. 4 is a top plan view of a spud in accordance with the present invention.
Figure 5:
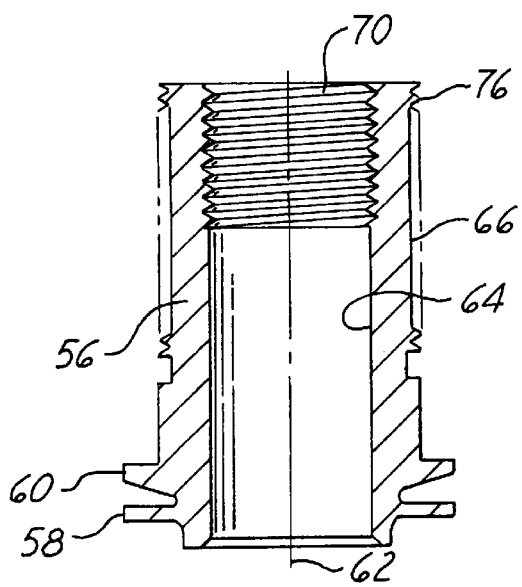
FIG. 5 is a cross-sectional view of the spud of FIG. 4 taken along lines 5–5.
Figure 6:
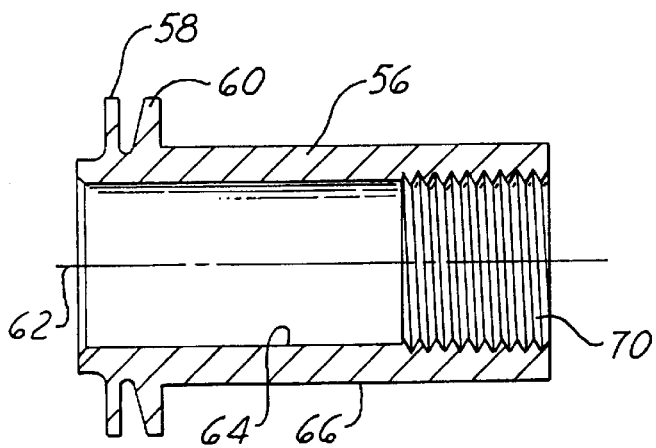
FIG. 6 is a cross-sectional view of the spud of FIG. 4 taken along lines 6–6.

Spud 50 is provided to connect bladder 22 to pump hose 48 or a similar means for supplying air, liquids, or similar mediums to bladder 22, Spud 50 may be made from a variety of conventional metals and plastics. Referring to FIGS. 4–6, a spud 50 in accordance with the present invention may include a body portion 56, a base portion 58, and a holding member 60.

Body portion 56 is centered about an axis 62 and includes inner and outer walls 64, 66. Inner wall 64 defines a bore through which air or fluid may pass to selectively expand and contract bladder 22. Inner wall 64 may include a plurality of threads 70 configured to matingly engage a corresponding plurality of threads (not shown) on pump hose 48. Referring to FIG. 4, outer wall 66 is substantially circular, but includes a pair of diametrically opposed flats 72, 74. Referring to FIG. 5, outer wall 66 may also include a plurality of threads 76 configured to matingly engage a corresponding plurality of threads 76 (best shown in FIGS. 2 and 3) on nut 54.

Base portion 58 is provided to provide a bonding surface for bladder 22 (best seen in FIG. 1) in order to secure spud 50 within bladder 22. Portion 56 is disposed at a first end of body portion 56 and extends radially outwardly from body portion 56. Base portion 58 May be circular in shape.

Holding member 60 is provided to restrict the movement of spud 50 in a first axial direction (to the right in FIG. 1). Member 60 extends radially outwardly from body portion 56 and may comprise a circular flange. It should be understood, however, that holding member 60 may take on other forms including one or more radially extending tabs Member 60 engages a first side 82 of holding plate 24 to prevent movement of spud 50 in the first axial direction. In accordance with the present invention, the radial distance of holding member 60 from axis 62 is preferably at least 1.15 times the radial distance of either outer wall 66 of body portion 56 or aperture 46 (aperture 46 generally being sized similarly to body portion 56), in a pair of constructed embodiments, the radial distances of holding member 60 from axis 62 are about 0.75 and about 1.125, respectively, while the radial distances of outer wall 66 and aperture 46 are about 0.594 and about 0.875, respectively. Thus, the radial distance of holding member 6o is about 1.263 (0,75/ 0.594) and about 1.286 (1.125/0.875) times the radial distance of either outer wall 66 or aperture 46 in the constructed embodiments. The comparative radial distance between holding member 60 and outer wall 66 of spud 50 is greater than in conventional spuds and represents an improvement over conventional spuds. The smaller comparative radial distance found in conventional spuds can cause the spud to be pulled through aperture 46 of plate 24 upon clamping of nut 54.

Figure 2:
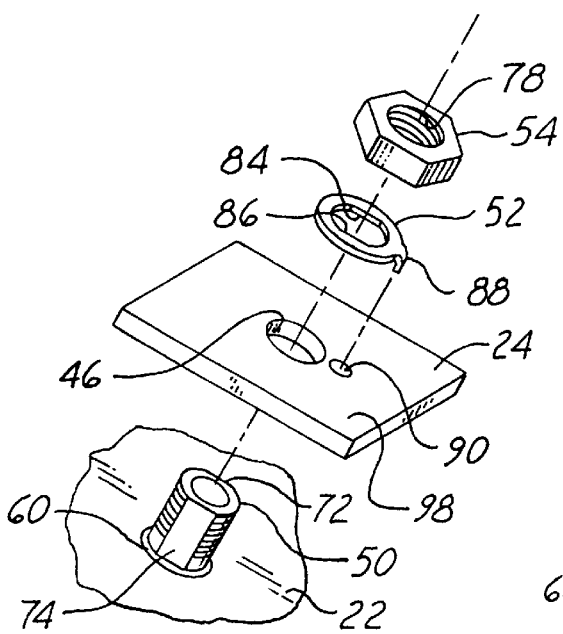
FIG. 2 is an exploded perspective view of a spud assembly in accordance with a first embodiment of the present invention.
Figure 3:
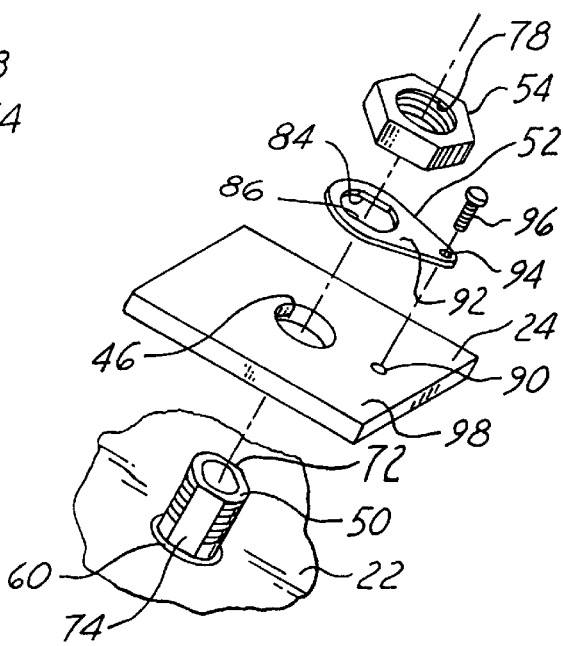
FIG. 3 is an exploded perspective view of a spud assembly in accordance with a second embodiment of the present invention.

Washer 52 is provided to restrict the rotational movement of spud 50. Washer 52 may be made from a variety of conventional metals and may be fixed against rotation relative to plate 24. Referring to FIG. 2, the inner periphery of washer 52 may be substantially circular, but may define a pair of diametrically opposed flats 84, 86. Flats 84, 86 correspond to flats 72, 74 of spud 50. Accordingly, washer 52 may be disposed about spud 50 and will prevent rotational movement of spud 50 relative to plate 24. Referring to FIG. 2, in accordance with a first embodiment of the present invention, washer 52 includes a tang 88 that may be inserted into an aperture 90 in plate 24 in order to restrict rotational movement of washer 52 and spud 50. Referring to FIG. 3, in accordance with a second embodiment of the present invention, washer 52 may include a land 92 having an aperture 94. Aperture 94 may align with aperture 90 of plate 24 and may be configured to receive a screw 96 or other fastener inserted in apertures 90, 94 to secure washer 52 and spud 50 against rotational movement relative to plate 24. Referring to FIG. 1, it should be understood that aperture 94 of washer 52 may alternatively be configured to align with and receive bolt 44 in place of screw 96.

Nut 54 is provided to restrict the axial movement of spud 50 in a second axial direction (to the left in FIG. 1). Nut 54 is conventional in the art and includes a plurality of threads 78 configured to matingly engage threads 76 of spud 50. Referring to FIG. 1, nut 54 may be clamped down against washer 52 to restrict axial movement of spud 50 in the second axial direction A spud assembly 26 in accordance with the present invention represents a significant improvement over conventional spud assemblies. First, the use of washer 52 to restrict the rotational movement of spud 50 eliminates the costly broaching or milling operation previously implemented in connection with holding plate 24. Second, by including threads 76 on spud 50 and extending holding member 60 radially relative to body portion 56, axial movement of spud 50 may be eliminated thereby eliminating failures at the spud/bladder interface in friction assembly 10.

While the invention has been particularly shown and described with reference to the preferred embodiments thereof, it is well understood by those skilled in the art that various changes and modifications can be trade in the invention without departing from the spirit and scope of the invention. For example, although spud assembly 26 was shown as used in a friction assembly 10, it should be understood that assembly 26 could be implemented in a wide variety of other applications where the transmission of air, liquids, or other mediums are required.

I claim:

1. A spud, comprising:
    a body portion centered about a first axis, said body portion having inner and outer walls, said outer wall including a first plurality of threads; and, a holding member extending radially outwardly from said body portion
    wherein the radial distance of said holding member from said first axis is at least 1.15 times the radial distance of said first plurality of threads of said outer wall of said body portion from said first axis.

2. The spud of claim 1 wherein said inner wall defines a circular bore and includes a second plurality of threads.

3. The spud of claim 1 wherein said outer wall includes a pair of diametrically opposed flats.

4. The spud of claim 1 wherein said holding member comprises a circular flange.

5. A spud assembly, comprising:
    a spud having a body portion centered about a first axis, said body portion configured to extend through a first aperture in a fixed member and having an outer wall including a first pair of a diametrically opposed flats, the spud further comprising a holding member extending radially outwardly from said body portion, said holding member adjacent a surface of said fixed member and configured to prevent said spud from moving in a first axial direction relative to said fixed member;
    a washer disposed about said spud, an inner periphery of said washer including a second pair of diametrically opposed flats corresponding to said first pair of diametrically opposed flats;
    wherein said washer is fixed against rotation relative to said fixed member to thereby restrict rotational movement of said spud.

6. The assembly of claim 5, further comprising means for restricting axial movement of said spud relative to said fixed member.

7. The assembly of claim 6 wherein said restricting means comprises a nut threaded onto one end of said spud.

8. The assembly of claim 5 wherein said outer wall of said spud includes a plurality of threads.

9. The assembly of claim 8 wherein the radial distance of said holding member from said first axis is at least 1.15 times the radial distance of said plurality of threads of said outer wall of said body portion from said first axis.

10. The assembly of claim 5 wherein the radial distance of said holding member from said first axis is at least 1.15 times the radial distance of said first aperture.

11. The assembly of claim 5 wherein said washer includes a tang configured to be inserted through a second aperture in said fixed member.

12. The assembly of claim 5 wherein said washer includes a land having a second aperture, said second aperture configured to align with a third aperture in said fixed member and to receive a fastener that extends through said second and third apertures.

13. A friction assembly, comprising:
    a hub extending along a first axis;
    a holding plate extending radially outwardly of said first axis and fixed to said hub, said holding plate having a first aperture extending therethrough;
    a pressure plate axially spaced from said holding plate;
    friction discs disposed on a first side of said pressure plate;
    a bladder disposed between said holding plate and a second side of said pressure plate;
    a spud connected to said bladder through which said bladder may be selectively expanded and contracted to cause axial movement in said pressure plate and selective engagement and disengagement of said pressure plate with said friction discs, said spud having a body portion that extends through said first aperture in said holding plate and includes an outer wall having a first pair of diametrically opposed flats, the spud further comprising a holding member extending radially outwardly from said body portion, said holding member adjacent a surface of said holding plate and configured to prevent said spud from moving in a first axial direction relative to said fixed member;
    a washer disposed about said spud, an inner periphery of said washer including a second pair of diametrically opposed flats corresponding to said first pair of diametrically opposed flats;
    wherein said washer is fixed against rotational movement relative to said holding plate to thereby restrict rotational movement of said spud.

14. The assembly of claim 13, further comprising means for restricting axial movement of said spud relative to said fixed member.

15. The assembly of claim 14 wherein said restricting means comprises a nut threaded onto one end of said spud.

16. The assembly of claim 13 wherein said outer wall of said spud includes a plurality of threads.

17. The assembly of claim 13 wherein first axis is at least 1.15 times as the radial distance of said body portion from said first axis.

18. The assembly of claim 13 wherein the radial distance of said holding member from said first axis is at least 1.15 times the radial distance of said first aperture.

19. The assembly of claim 13 wherein said washer includes a tang configured to be inserted through a second aperture in said fixed member.

20. The assembly of claim 13 wherein said fixed member includes a second aperture and said washer includes a land having a third aperture, said second and third apertures configured to receive a fastener inserted through said second and third apertures.

* * * * *

UNITED STATES PATENT AND TRADEMARK OFFICE
CERTIFICATE OF CORRECTION

PATENT NO.    : 6,098,775
DATED         : August 8, 2000
INVENTOR(S)   : Douglas Alan Chojecki Page 1 of 1

It is certified that error appears in the above-identified patent and that said Letters Patent is hereby corrected as shown below:

<u>Claim 17,</u>
After "wherein" insert "the radial distance of said holding member from said."

Signed and Sealed this

Seventh Day of August, 2001

*Attest:*

*Nicholas P. Godici*

*Attesting Officer*

NICHOLAS P. GODICI
*Acting Director of the United States Patent and Trademark Office*